US012613021B1

(12) United States Patent
Grogan et al.

(10) Patent No.: US 12,613,021 B1
(45) Date of Patent: Apr. 28, 2026

(54) FOG LAMP WITH ADJUSTABLE CUT-OFF LINE

(71) Applicant: Myotek Holdings, Inc., Irvine, CA (US)

(72) Inventors: Teerawan Grogan, London, OH (US); Aaron M. Eberle, Westerville, OH (US)

(73) Assignee: Myotek Holdings, Inc., Irvine, CA (US)

(*) Notice: Subject to any disclaimer, the term of this patent is extended or adjusted under 35 U.S.C. 154(b) by 0 days.

(21) Appl. No.: 19/194,370

(22) Filed: Apr. 30, 2025

(51) Int. Cl.

| | |
|---|---|
| ***F21S 41/19*** | (2018.01) |
| ***F21S 41/141*** | (2018.01) |
| ***F21S 41/20*** | (2018.01) |
| ***F21S 41/63*** | (2018.01) |
| ***F21S 45/48*** | (2018.01) |
| *F21W 102/135* | (2018.01) |
| *F21W 102/30* | (2018.01) |
| *F21Y 115/10* | (2016.01) |

(52) U.S. Cl.
CPC ........... *F21S 41/635* (2018.01); *F21S 41/141* (2018.01); *F21S 41/192* (2018.01); *F21S 41/2805* (2024.05); *F21S 45/48* (2018.01); *F21W 2102/135* (2018.01); *F21W 2102/30* (2018.01); *F21Y 2115/10* (2016.08)

(58) Field of Classification Search
CPC ...... F21S 41/635; F21S 41/141; F21S 41/192; F21S 41/2805; F21S 45/48; F21S 41/285; F21S 41/25; F21S 41/26; F21S 41/24; F21S 41/255; F21W 2102/135; F21W 2102/30; F21Y 2115/10; F21V 13/04; F21V 14/00; F21V 17/16; F21V 17/164; F21V 17/166; F21V 17/168; F21V 17/18; F21V 17/14; F21V 17/108; B60Q 2200/30
See application file for complete search history.

(56) References Cited

U.S. PATENT DOCUMENTS

| | | | |
|---|---|---|---|
| 2,254,961 | A | 9/1941 | Harris |
| 3,124,309 | A | 3/1964 | Cantoni et al. |
| 4,827,367 | A | 5/1989 | Luciani et al. |
| 5,730,519 | A | 3/1998 | Okuchi et al. |
| 6,431,736 | B1 | 8/2002 | Saladin |
| 6,724,543 | B1 | 4/2004 | Chinniah et al. |
| 6,863,427 | B1 | 3/2005 | Albou |
| 6,953,271 | B2 | 10/2005 | Ayniéet al. |
| 7,152,985 | B2 | 12/2006 | Benitez et al. |
| 7,204,627 | B2 | 4/2007 | Ishida |
| 7,207,700 | B2 | 4/2007 | Fallahi et al. |
| 7,364,332 | B2 | 4/2008 | Komatsu et al. |
| 7,401,948 | B2 | 7/2008 | Chinniah et al. |

(Continued)

FOREIGN PATENT DOCUMENTS

| | | | | |
|---|---|---|---|---|
| CN | 208846335 U | * | 5/2019 | ............. F21S 41/32 |
| DE | 10312364 A1 | | 1/2005 | |

(Continued)

OTHER PUBLICATIONS

Search English translation of CN 208846335 U (Year: 2019).*

*Primary Examiner* — Omar Rojas Cadima
(74) *Attorney, Agent, or Firm* — Barnes & Thornburg LLP

(57) ABSTRACT

An automotive lamp is configured to emit a light beam with an adjustable cut-off line. The cut-off line is adjusted by altering a position of an inner lens within the automotive lamp.

15 Claims, 6 Drawing Sheets

(56) References Cited

U.S. PATENT DOCUMENTS

| | | | | |
|---|---|---|---|---|
| 7,452,114 | B2 | 11/2008 | Gasquet | |
| 7,489,453 | B2 | 2/2009 | Chinniah et al. | |
| 7,578,608 | B2 | 8/2009 | Albon | |
| 7,618,160 | B2 | 11/2009 | Chinniah et al. | |
| 7,837,349 | B2 | 11/2010 | Chinniah et al. | |
| 7,997,779 | B2 | 8/2011 | Futami | |
| 8,845,142 | B2 | 9/2014 | de Lamberterie | |
| 9,664,353 | B2 | 5/2017 | Maliar et al. | |
| 10,012,359 | B2 | 7/2018 | Doha et al. | |
| 10,161,587 | B2 | 12/2018 | Gousset-Rousseau | |
| 11,313,530 | B2 | 4/2022 | Dinant et al. | |
| 2005/0057940 | A1 | 3/2005 | Capello et al. | |
| 2005/0190572 | A1 | 9/2005 | Komatsu et al. | |
| 2008/0310028 | A1 | 12/2008 | Chinniah et al. | |
| 2008/0310166 | A1 | 12/2008 | Chinniah et al. | |
| 2016/0084462 | A1* | 3/2016 | Suwa | F21S 41/635 362/511 |
| 2016/0137122 | A1* | 5/2016 | Oshima | F21S 41/635 362/512 |
| 2017/0370548 | A1 | 12/2017 | Dinant et al. | |
| 2020/0348004 | A1 | 11/2020 | Dinant et al. | |

FOREIGN PATENT DOCUMENTS

| | | | |
|---|---|---|---|
| EP | 1526038 | B1 | 4/2005 |
| EP | 1467143 | B1 | 7/2007 |
| EP | 2237080 | A1 | 10/2010 |
| EP | 1970619 | B1 | 2/2012 |
| FR | 2602305 | B1 | 3/1990 |
| FR | 2889289 | A1 | 2/2007 |
| FR | 3007503 | A1 | 12/2014 |
| FR | 3068437 | B1 | 1/2020 |
| FR | 3063337 | B1 | 7/2021 |

* cited by examiner

FOG LAMP WITH ADJUSTABLE CUT-OFF LINE

BACKGROUND

The present disclosure relates to an automotive lamp and, more particularly, a fog lamp with an adjustable cut-off line.

Some automotive lamps are configured to generate a cut-off line above ground level because the beam cannot be generated too high or too low. Accordingly, a vertical position of the cut-off line must be adjusted. Known automotive lamps use moveable masks or reflectors to adjust the cut-off line.

SUMMARY

The present disclosure includes one or more of the features recited in the appended claims and/or the following features which, alone or in any combination, may comprise patentable subject matter.

In a first aspect of the disclosed embodiments, an automotive lamp includes a light source configured to emit a light beam. An inner lens is configured to transmit the light beam. The inner lens has at least one arm including an arm opening. A moveable bracket is configured to rotate about a rotational axis. The moveable bracket includes at least one hook that is inserted into the arm opening of the at least one arm to secure the inner lens to the moveable bracket so that the inner lens rotates about the rotational axis with the moveable bracket. An adjustment screw is configured to rotate the moveable bracket about the rotational axis.

In some embodiments of the first aspect, the at least one arm may include a forward arm surface. The arm opening may extend through the forward arm surface. The at least one hook may include a flange. The flange may secure against the forward arm surface of the arm when the inner lens is coupled to the bracket. The at least one hook may include a pair of hooks and each hook of the pair of hooks includes a flange. The flange of a first hook of the pair of hooks may extend in a first direction. The flange of a second hook of the pair of hooks may extend in a second direction that is opposite to the first direction. The at least one arm may include two arms. Each of the two arms may include an arm opening. The at least one hook may include two hooks. Each hook of the two hooks may be configured to be inserted to the arm opening of one of the two arms. The two arms may extend in opposite directions from the inner lens. The bracket may include a threaded component that receives a threaded end of the adjustment screw.

In an second aspect of the disclosed embodiments, an automotive lamp includes a printed circuit board including a light source configured to emit a light beam. An inner lens is configured to transmit the light beam. A moveable bracket is configured to rotate about a rotational axis. The inner lens is secured to the moveable bracket so that the printed circuit board is positioned between the moveable bracket and the inner lens. The inner lens rotates about the rotational axis with the moveable bracket. An adjustment screw is configured to rotate the moveable bracket about the rotational axis.

In some embodiments of the second aspect, the printed circuit board may be secured to a heat sink. The heat sink may include at least one notch that receives a tab of the bracket so that the bracket rotates relative to the heat sink. The rotational axis may extend through the at least one notch of the heat sink and the tab of the bracket. The heat sink may be secured to a housing to enclose the bracket, the printed circuit board, and the inner lens. The inner lens may extend through an opening formed in the housing. The printed circuit board may remain stationary when the moveable bracket and the inner lens rotate about the rotational axis.

In a third aspect of the disclosed embodiments, an automotive lamp includes a light source configured to emit a light beam. An inner lens is configured to transmit the light beam. The inner lens includes a convex surface and a pair of flat outer surfaces. One of the flat outer surfaces is positioned above the convex surface and one of the flat outer surfaces is positioned below the convex surface. The convex surface extends forward of the pair of flat outer surfaces. A moveable bracket is configured to rotate about a rotational axis. The moveable bracket is secured the inner lens so that the inner lens rotates about the rotational axis with the moveable bracket. An adjustment screw is configured to rotate the moveable bracket about the rotational axis.

In some embodiments of the third aspect a housing may be provided. The inner lens may extend through an opening in the housing. An outer lens may be coupled to the housing. The inner lens may be positioned behind the outer lens. The inner lens may move relative to the housing when the inner lens rotates about the rotational axis. The inner lens may rotate up and down relative to the housing. A horizontal plane may bisect the convex surface. Each of the flat outer surfaces may extend at an oblique angle relative to the horizontal plane.

Additional features, which alone or in combination with any other feature(s), such as those listed above and those listed in the claims, may comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures in which.

DETAILED DESCRIPTION

Figure 1:
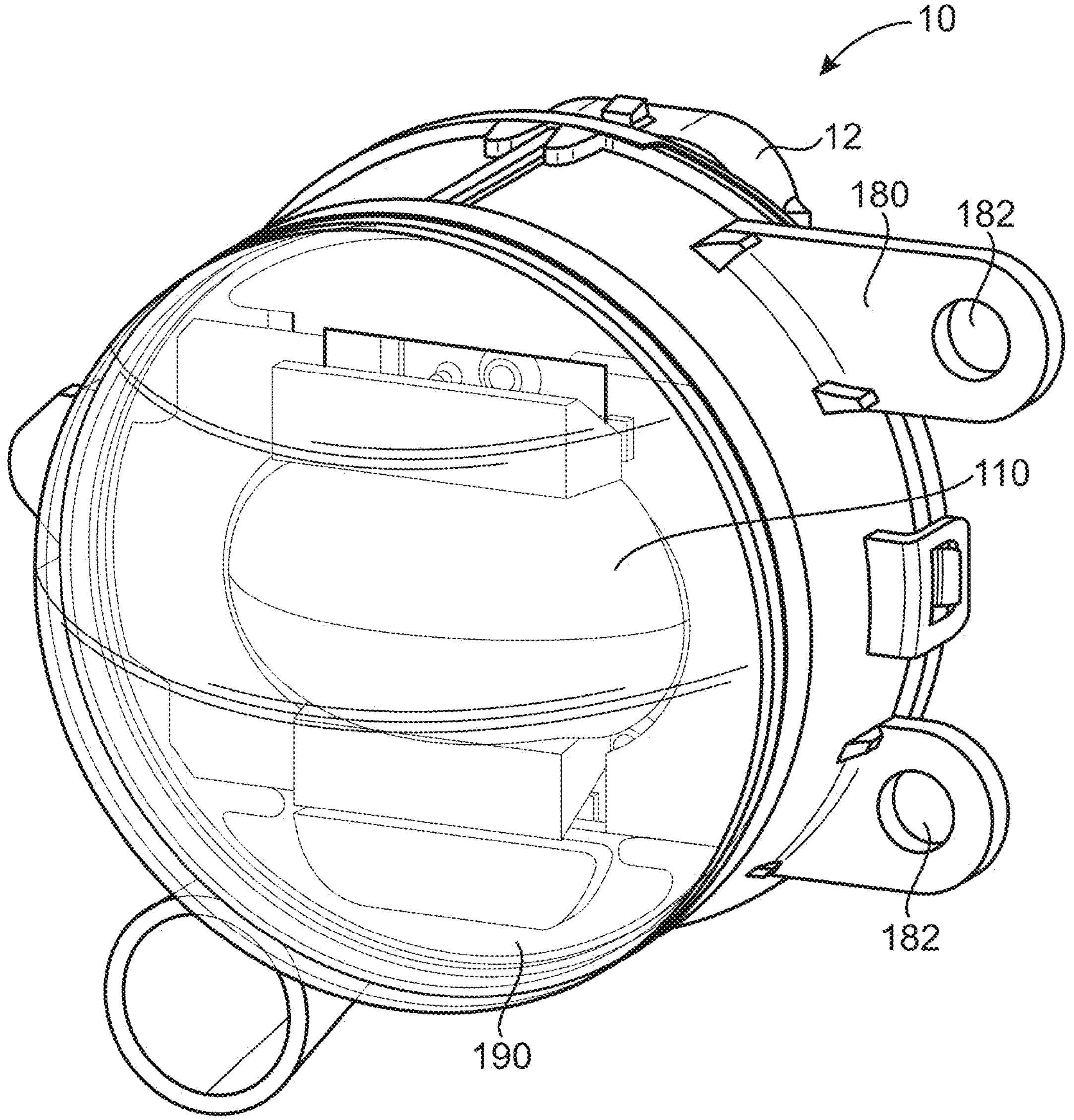
FIG. 1 is a front perspective view of an automotive lamp embodied as a fog lamp.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Figure 2:
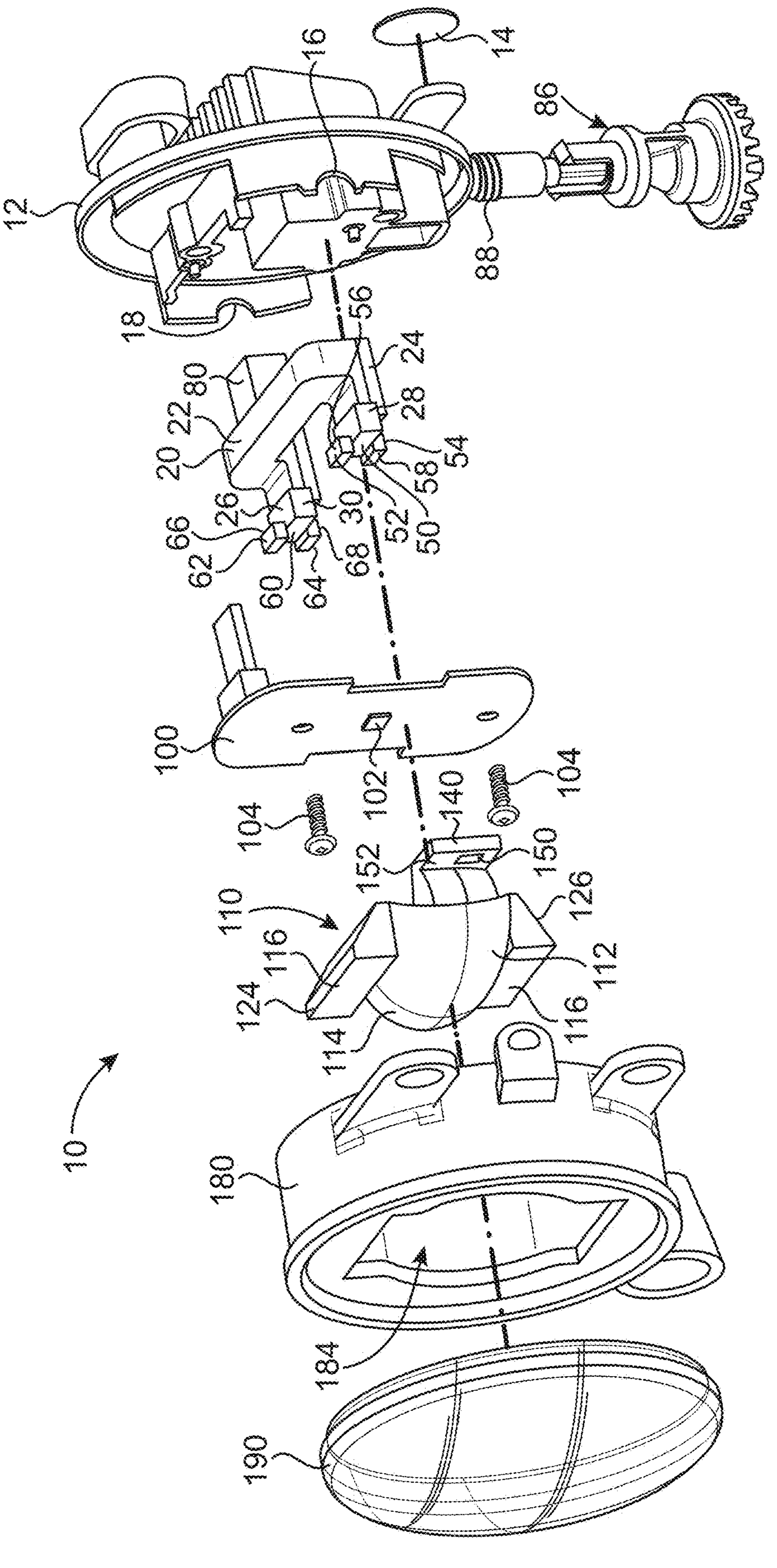
FIG. 2 is an exploded view of the automotive lamp shown in FIG. 1.
Figure 3:
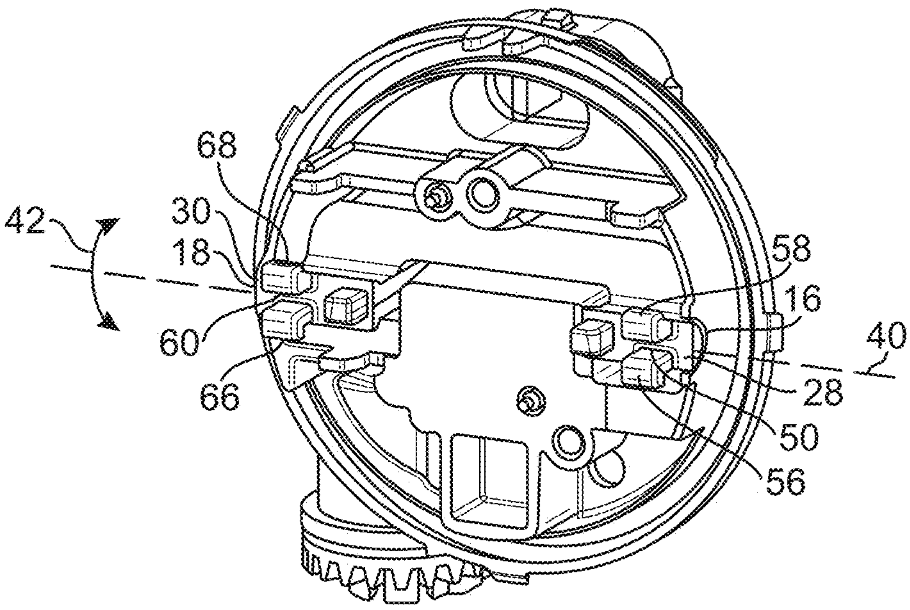
FIG. 3 is a perspective view of the moveable bracket of the automotive lamp shown in FIG. 2 coupled to the heat sink of the automotive lamp shown in FIG. 2.

Referring to FIGS. 1-2, an automotive lamp 10 is configured to emit a light beam with an adjustable cut-off line. The automotive lamp 10 includes a heat sink 12 configured to dissipate heat from the automotive lamp 10. A gore patch 14 adhered to the heat sink 12 allows air to flow to and from the heat sink 12 to cool the automotive lamp 10 while also preventing moisture from entering the automotive lamp 10 through the heat sink 12. The heat sink 12 includes a left notch 16 and a right notch 18 formed on opposite sides of the heat sink 12. The left notch 16 and the right notch 18 are configured to moveably retain a moveable bracket 20 within the automotive lamp 10.

Figure 9:
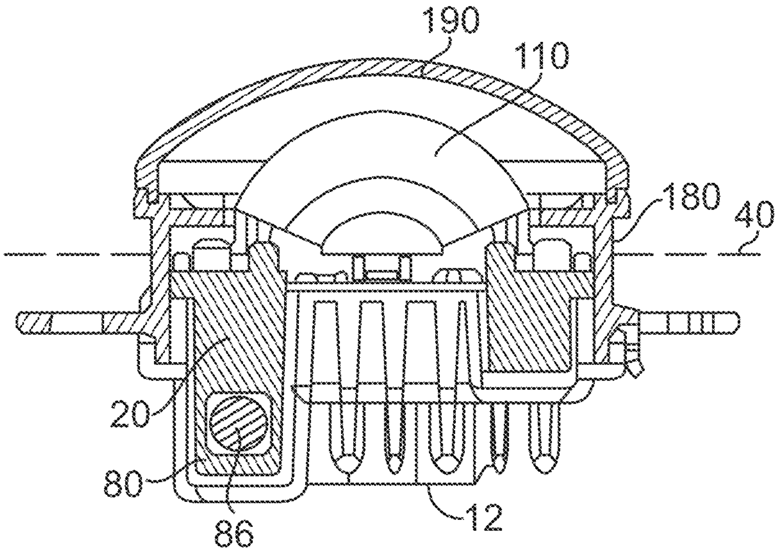
FIG. 9 is a cross-sectional view of the automotive lamp shown in FIG. 1 and taken along line 9-9.

The moveable bracket 20 includes a main body 22 that includes a left arm 24 and a right arm 26 positioned on opposite sides of the main body 22. The left arm 24 includes a left tab 28 and the right arm 26 includes a right tab 30. The left tab 28 is configured to position in the left notch 16, and the right tab 30 is configured to position in the right notch 18 to moveably secure the moveable bracket 20 to the heat sink 12, as shown in FIGS. 3-5 and 9. A rotational axis 40 extends through the notches 16, 18 and the tabs 28, 30, as shown in FIG. 9. The moveable bracket 20 is configured to rotate about the rotational axis 40. In an exemplary embodiment, the moveable bracket 20 rotates up and down relative to the heat sink 12 in a rotational direction 42 that is perpendicular to the rotational axis 40.

The left arm 24 includes a left engagement mechanism 50 having an upper hook 52 extending forward from the left arm 24, and a lower hook 54 extending forward from the left arm 24. In an exemplary embodiment, the upper hook 52 and the lower hook 54 each extend perpendicular to the left arm 24. The upper hook 52 includes an upper flange 56 extending upward from the upper hook 52, and the lower hook 54 includes a lower flange 58 extending downward from the lower hook 54 in a direction opposite the upper flange 56. In an exemplary embodiment, the upper flange 56 extends perpendicular to the upper hook 52, and the lower flange 58 extends perpendicular to the lower hook 54. The right arm 26 includes a right engagement mechanism 60 having an upper hook 62 extending forward from the right arm 26, and a lower hook 64 extending forward from the right arm 26. In an exemplary embodiment, the upper hook 62 and the lower hook 64 each extend perpendicular to the right arm 26. The upper hook 62 includes an upper flange 66 extending upward from the upper hook 62, and the lower hook 64 includes a lower flange 68 extending downward from the lower hook 64 in a direction opposite the upper flange 66. In an exemplary embodiment, the upper flange 66 extends perpendicular to the upper hook 62, and the lower flange 68 extends perpendicular to the lower hook 64.

Figure 6:
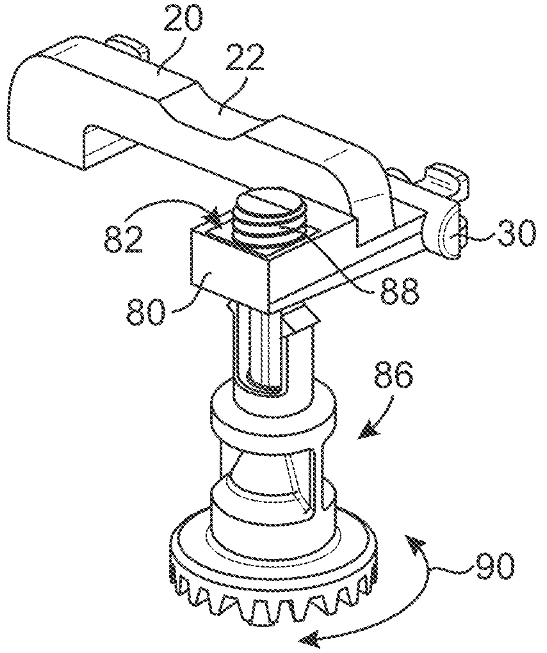
FIG. 6 is a perspective view of the aiming component shown in FIG. 2 inserted into the moveable bracket shown in FIG. 2.
Figure 10:
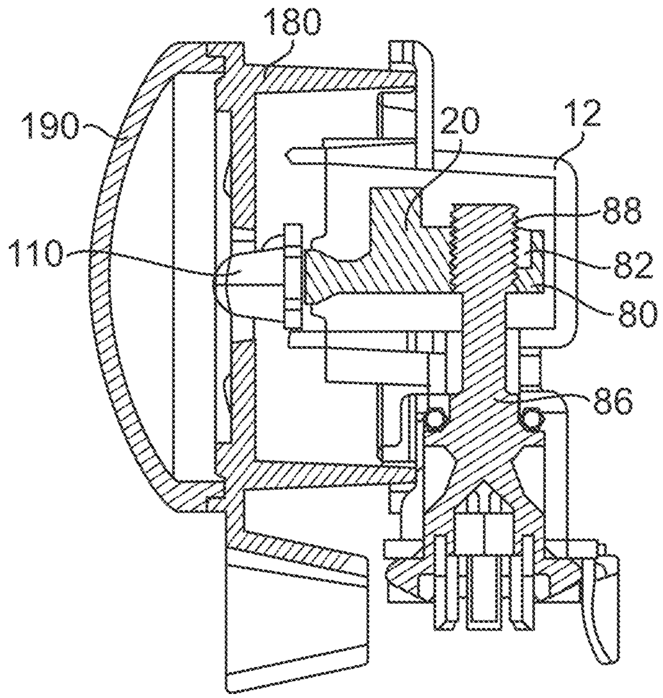
FIG. 10 is a cross-sectional view of the automotive lamp shown in FIG. 1 and taken along line 10-10.

An aiming component 80 extends from the main body 22 of the moveable bracket 20. The aiming component 80 includes a threaded opening 82. The threaded opening 82 includes an inner surface 84 that includes threads configured to engage an adjustment screw 86. A threaded end 88 of the adjustment screw 86 extends through the threaded opening 82 and is configured to rotate the moveable bracket 20 about the rotational axis 40, as shown in FIGS. 6 and 10. An actuating end 88 of the adjustment screw 86 extends out of the threaded opening 82 and is configured to couple to an actuator (not shown). The actuator rotates the adjustment screw 86 about a rotational axis 90 that extends perpendicular to the rotational axis 40. Rotation of the adjustment screw 86 about the rotational axis 90 causes the moveable bracket 20 to rotate about the rotational axis 40 through the engagement of the threaded end 88 of the adjustment screw 86 with the threaded opening 82.

Figure 4:
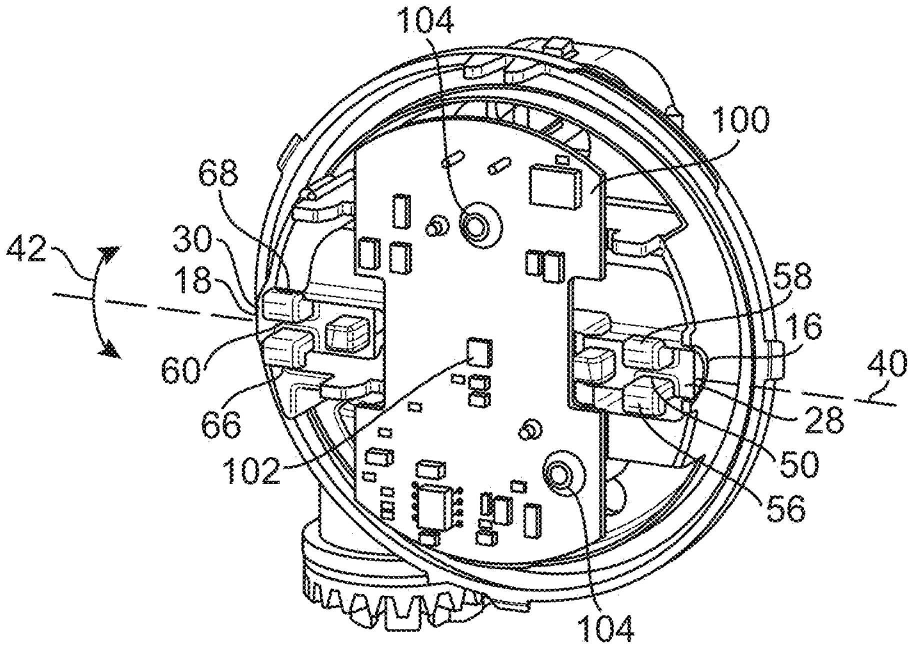
FIG. 4 is a perspective view of the printer circuit board of the automotive lamp shown in FIG. 2 coupled to the heat sink shown in FIG. 2 forward of the moveable bracket shown in FIG. 2.

A printed circuit board 100 includes a light source 102. In an exemplary embodiment, the light source 102 is a light emitting diode. In some embodiments, the printed circuit board 100 includes additional circuitry for controlling an operation of the light source 102. The printed circuit board 100 is configured to be screwed into the heat sink 12 with screws 104. It may be contemplated that other fastening mechanisms may be utilized to secure the printed circuit board 100 to the heat sink 12, in some embodiments. Additionally, it may be contemplated, in some embodiments, to secure the printed circuit board 100 to another component of the automotive lamp 10. In the exemplary embodiments, the printed circuit board 100 is positioned forward of the moveable bracket 20, as shown in FIG. 4. Specifically, the printed circuit board 100 is positioned forward of the main body 22 of the moveable bracket 20. The moveable bracket 20 moves relative to the printed circuit board 100, while the printed circuit board 100 remains stationary.

Figure 5:
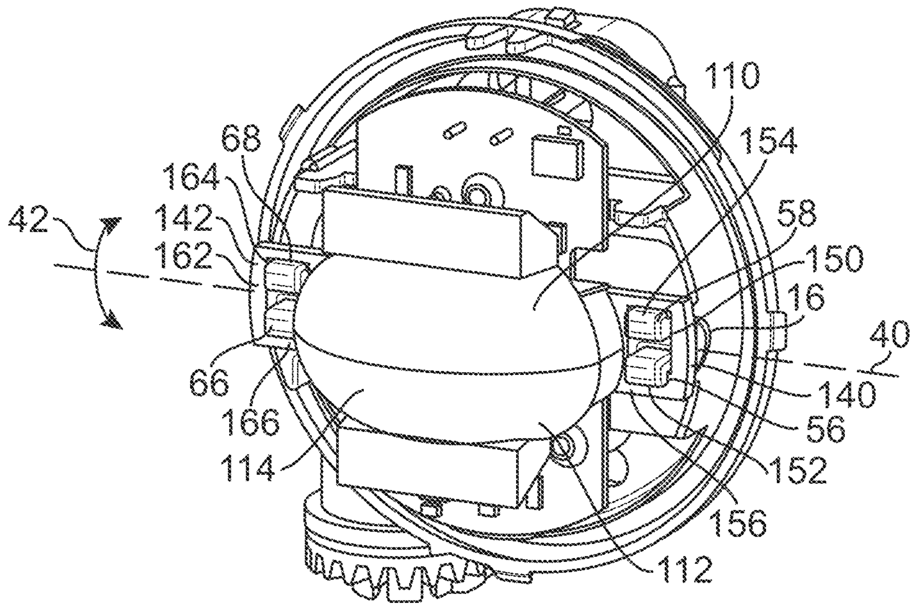
FIG. 5 is a perspective view of the inner lens shown in FIG. 2 coupled to the moveable bracket shown in FIG. 2 forward of the printed circuit board shown in FIG. 2.

An inner lens 110 is configured to transmit the light beam from the light source 102. The inner lens 110 is positioned forward of the printed circuit board 100 to transmit the light beam in a forward direction. The inner lens 110 is positioned so that the printed circuit board 100 is positioned between the moveable bracket 20 and the inner lens 110, as shown in FIG. 5. The inner lens 110 includes a lens segment 112 that is configured to transmit the light beam. The lens segment 112 includes a convex surface 114 and a pair of flat outer surfaces 116. A horizontal plane 118, shown in FIG. 8, bisects the convex surface 114 and divides the convex surface 114 into an upper half 120 and a lower half 122. In an exemplary embodiment, the upper half 120 is a mirror image of the lower half 122. An upper outer surface 124 extends from the upper half 120 of the convex surface 114, and a lower outer surface 126 extends from the lower half 122 of the convex surface 114. In one embodiment, both the upper outer surface 124 and the lower outer surface 126 extend at an oblique angle relative to the horizontal plane 118. In some embodiments, one of the upper outer surface 124 and the lower outer surface 126 extends at an oblique angle relative to the horizontal plane 118. In one embodiment, a forward end 128 of the convex surface 114 extends forward of a forward end 130 of the upper outer surface 124 and the lower outer surface 126. In one embodiment, the forward end 128 of the convex surface 114 extends forward of the forward end 130 of one of the upper outer surface 124 and the lower outer surface 126.

The inner lens 110 is coupled to the moveable bracket 20. In an exemplary embodiment, the inner lens 110 and the moveable bracket 20 are separate components that are coupled together, as described below. In one embodiment, the inner lens 110 and the moveable bracket 20 are formed from different materials. The inner lens 110 includes a left arm 140 and a right arm 142. The left arm 140 and the right arm 142 extend in opposite directions from the lens segment 112. The left arm 140 of the inner lens 110 is configured to couple to the left engagement mechanism 50 of the moveable bracket 20, and the right arm 142 is configured to couple to the right engagement mechanism 60 of the moveable bracket 20. The left arm 140 includes an arm opening 150 extending through a forward surface 152 of the left arm 140. The forward surface 152 includes an upper surface 154 positioned above the arm opening 150 and a lower surface 156 positioned below the arm opening 150. The left engagement mechanism 50 extends through the arm opening 150 so that the upper flange 56 of the upper hook 52 engages the upper surface 154 of the forward surface 152, and the lower flange 58 of the lower hook 54 engages the lower surface 156 of the forward surface 152 to secure the left engagement mechanism 50 to the left arm 140 of the inner lens 110. The right arm 142 includes an arm opening 160 extending through a forward surface 162 of the right arm 142. The forward surface 162 includes an upper surface 164 positioned above the arm opening 160 and a lower surface 166 positioned below the arm opening 160. The right engagement mechanism 60 extends through the arm opening 160 so that the upper flange 66 of the upper hook 62 engages the upper surface 164 of the forward surface 162, and the lower flange 68 of the lower hook 64 engages the lower surface 166 of the forward surface 162 to secure the right engagement mechanism 60 to the right arm 142 of the inner lens 110. When coupled to the moveable bracket 20, the inner lens 110 rotates about rotational axis 40 with the moveable bracket 20. In an exemplary embodiment, the inner lens 110 is vertically adjusted about the rotational axis 40. The printed circuit board 100 remains stationary when the moveable bracket 20 and the inner lens 110 rotate about the rotational axis 40.

Figure 8:
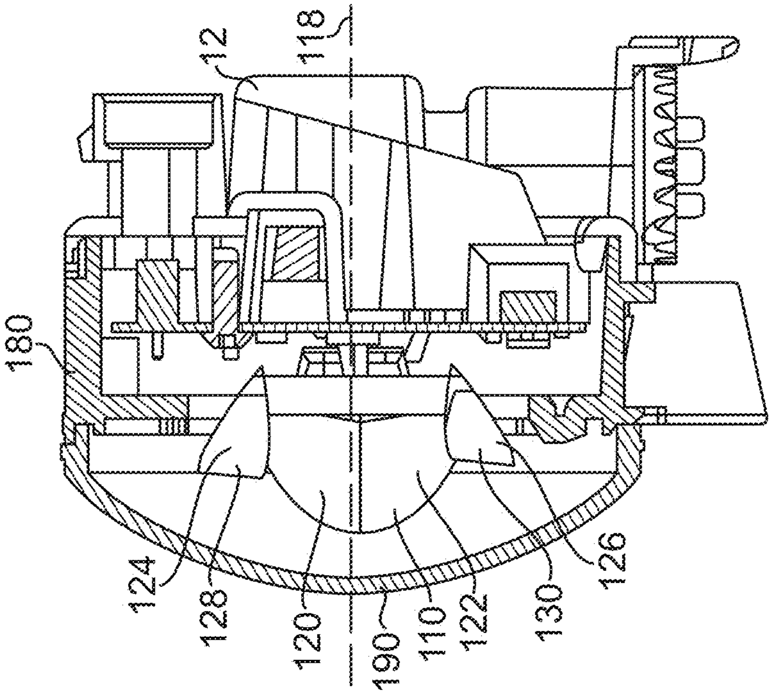
FIG. 8 is a cross-sectional view of the automotive lamp shown in FIG. 1 and taken along line 8-8.
Figure 7:
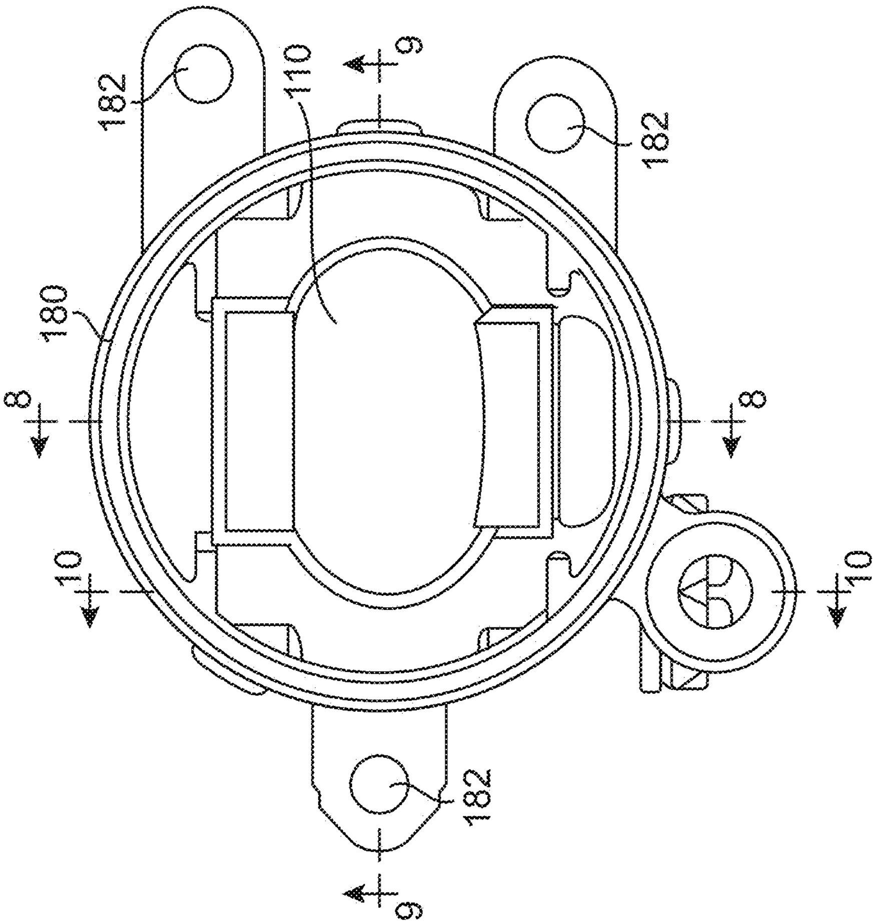
FIG. 7 is a front view of the automotive lamp shown in FIG. 1 having a plurality of cross-sections illustrated thereon.

A housing 180 attaches to the heat sink 12, as shown in FIG. 8. In one embodiment, the housing 180 is snap fit to the heat sink 12. The housing 180 includes a plurality of connection points 182, as shown in FIG. 7, that enable the automotive lamp 10 to be positioned in and coupled to a vehicle (not shown). In the exemplary embodiment, the connection points 182 are configured to receive screws to couple to automotive lamp 10 to the vehicle. It will be appreciated that other connection mechanisms may be contemplated, in some embodiments. The housing 180 couples to the heat sink 12 to enclose the moveable bracket 20, the printed circuit board 100, and the inner lens 110 between the housing 180 and the heat sink 12. The housing 180 includes an opening 184 that is sized and shaped to the inner lens 110. The inner lens 110 extends through the opening 184 and configured to move relative to the housing 180 when the inner lens 110 is rotate about the rotational axis 40. In an exemplary embodiment, the inner lens 110 rotates up and down relative to the housing 180 in the rotational direction 42. An outer lens 190 is coupled to the housing 180 so that the inner lens 110 is positioned behind the outer lens 190, as shown in FIG. 8.

Any theory, mechanism of operation, proof, or finding stated herein is meant to further enhance understanding of principles of the present disclosure and is not intended to make the present disclosure in any way dependent upon such theory, mechanism of operation, illustrative embodiment, proof, or finding. It should be understood that while the use of the word preferable, preferably or preferred in the description above indicates that the feature so described can be more desirable, it nonetheless cannot be necessary and embodiments lacking the same can be contemplated as within the scope of the disclosure, that scope being defined by the claims that follow.

In reading the claims it is intended that when words such as "a," "an," "at least one," "at least a portion" are used there is no intention to limit the claim to only one item unless specifically stated to the contrary in the claim. When the language "at least a portion" and/or "a portion" is used, the item can include a portion and/or the entire item unless specifically stated to the contrary.

It should be understood that only selected embodiments have been shown and described and that all possible alternatives, modifications, aspects, combinations, principles, variations, and equivalents that come within the spirit of the disclosure as defined herein or by any of the following claims are desired to be protected. While embodiments of the disclosure have been illustrated and described in detail in the drawings and foregoing description, the same are to be considered as illustrative and not intended to be exhaustive or to limit the disclosure to the precise forms disclosed. Additional alternatives, modifications and variations can be apparent to those skilled in the art. Also, while multiple inventive aspects and principles have been presented, they need not be utilized in combination, and many combinations of aspects and principles are possible in light of the various embodiments provided above.

The invention claimed is:

1. An automotive lamp comprising:

a light source configured to emit a light beam, an inner lens configured to transmit the light beam, the inner lens having at least one arm including an arm opening, a moveable bracket configured to rotate about a rotational axis, wherein the moveable bracket includes at least one hook that is inserted into the arm opening of the at least one arm to secure the inner lens to the moveable bracket so that the inner lens rotates about the rotational axis with the moveable bracket, and an adjustment screw configured to rotate the moveable bracket about the rotational axis, wherein the at least one arm includes a forward arm surface, and the arm opening extends through the forward arm surface, wherein the at least one hook includes a flange, wherein the flange secures against the forward arm surface of the arm when the inner lens is coupled to the bracket, wherein the at least one hook includes a pair of hooks and each hook of the pair of hooks includes a flange, wherein the flange of a first hook of the pair of hooks extends in a first direction, and the flange of a second hook of the pair of hooks extends in a second direction that is opposite to the first direction.

2. The automotive lamp of claim 1, wherein:

the at least one arm includes two arms, wherein each of the two arms includes an arm opening, and the at least one hook includes two hooks, wherein each hook of the two hooks is configured to be inserted to the arm opening of one of the two arms.

3. The automotive lamp of claim 2, wherein the two arms extend in opposite directions from the inner lens.

4. The automotive lamp of claim 1, wherein the bracket includes a threaded component that receives a threaded end of the adjustment screw.

5. An automotive lamp comprising:

a printed circuit board including a light source configured to emit a light beam, an inner lens configured to transmit the light beam, a moveable bracket configured to rotate about a rotational axis, wherein the inner lens is secured to the moveable bracket so that the printed circuit board is positioned between the moveable bracket and the inner lens, wherein the inner lens rotates about the rotational axis with the moveable bracket, and an adjustment screw configured to rotate the moveable bracket about the rotational axis, wherein the printed circuit board is secured to a heat sink, and wherein the heat sink includes at least one notch that receives a tab of the bracket so that the bracket rotates relative to the heat sink.

6. The automotive lamp of claim 5, wherein the rotational axis extends through the at least one notch of the heat sink and the tab of the bracket.

7. The automotive lamp of claim 5, wherein the heat sink is secured to a housing to enclose the bracket, the printed circuit board, and the inner lens.

8. The automotive lamp of claim 7, wherein the inner lens extends through an opening formed in the housing.

9. The automotive lamp of claim 5, wherein the printed circuit board remains stationary when the moveable bracket and the inner lens rotate about the rotational axis.

10. An automotive lamp comprising:

a light source configured to emit a light beam, an inner lens configured to transmit the light beam, the inner lens including a convex surface and a pair of flat outer surfaces, wherein one of the flat outer surfaces is positioned above the convex surface and one of the flat outer surfaces is positioned below the convex surface, and wherein the convex surface extends forward of the pair of flat outer surfaces, the inner lens having at least one arm including an arm opening, a moveable bracket configured to rotate about a rotational axis, wherein the moveable bracket is secured the inner lens so that the inner lens rotates about the rotational axis with the moveable bracket, wherein the moveable bracket includes a pair of hooks that are inserted into the arm opening of the at least one arm to secure the inner lens to the moveable bracket, wherein a first hook of the pair of hooks extends in a different direction than a second hook of the pair of hooks, and an adjustment screw configured to rotate the moveable bracket about the rotational axis.

11. The automotive lamp of claim 10, further comprising a housing, wherein the inner lens extends through an opening in the housing.

12. The automotive lamp of claim 11, further comprising an outer lens that couples to the housing, wherein the inner lens is positioned behind the outer lens.

13. The automotive lamp of claim 11, wherein the inner lens moves relative to the housing when the inner lens rotates about the rotational axis.

14. The automotive lamp of claim 13, wherein the inner lens rotates up and down relative to the housing.

15. The automotive lamp of claim 10, wherein a horizontal plane bisects the convex surface, and each of the flat outer surfaces extends at an oblique angle relative to the horizontal plane.

* * * * *